Oct. 15, 1935.  G. M. KRIEGBAUM ET AL  2,017,759

SEED DISPENSING DEVICE FOR PLANTERS

Filed Feb. 14, 1934  3 Sheets-Sheet 1

Inventors
George M. Kriegbaum
Clarence C. Haas
By V. F. Lavague
Atty.

Oct. 15, 1935.  G. M. KRIEGBAUM ET AL  2,017,759
SEED DISPENSING DEVICE FOR PLANTERS
Filed Feb. 14, 1934  3 Sheets-Sheet 2

Inventors
George M. Kriegbaum
Clarence C. Haas
By V. T. Susague
Atty.

Oct. 15, 1935.  G. M. KRIEGBAUM ET AL  2,017,759
SEED DISPENSING DEVICE FOR PLANTERS
Filed Feb. 14, 1934  3 Sheets-Sheet 3
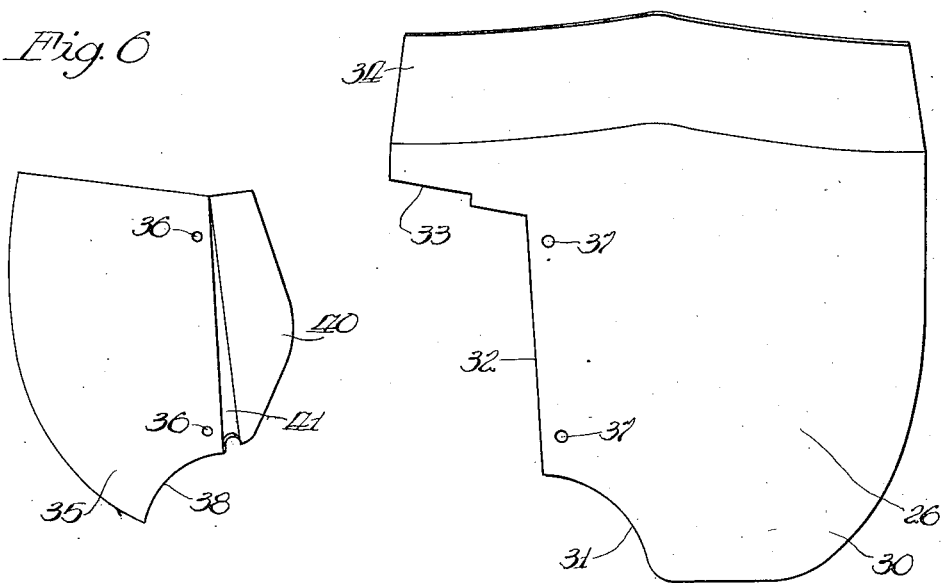
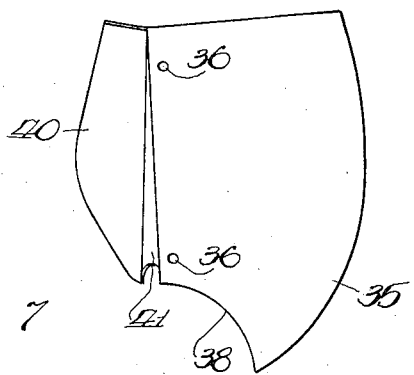
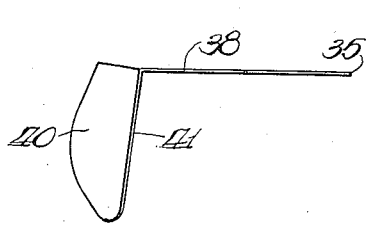
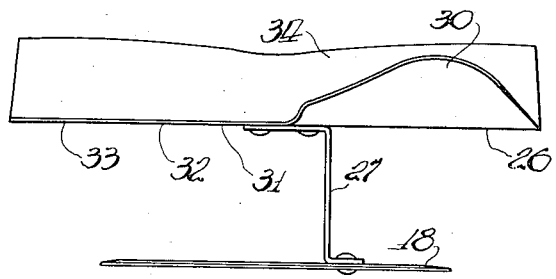

Patented Oct. 15, 1935

2,017,759

UNITED STATES PATENT OFFICE 2,017,759

SEED DISPENSING DEVICE FOR PLANTERS

George M. Kriegbaum and Clarence C. Haas, Richmond, Ind., assignors to International Harvester Company, a corporation of New Jersey Application February 14, 1934, Serial No. 711,210

3 Claims. (Cl. 221—135)

This invention relates to a seed planter. More particularly it relates to a hopper construction for planting different sizes of seeds.

In planting peanuts the seeds are sometimes planted in the shell, the whole peanut being planted, and other times the shelled peanuts being used for seed. It is, therefore, desirable to construct a planter to be used for peanuts with means for successfully planting either whole peanuts or the shelled seed.

The object of the present invention is to so construct a hopper for peanut planters that it may be adjusted to properly plant the whole peanut or the shelled nuts. Other objects, such as the provision of deflectors and means to prevent the crushing of seed, will be apparent from the detailed description to follow.

In the drawings, an implement of the invention has been illustrated.

Figure 5 is a top plan view taken at right angles to the surface of the partition with the deflector plate removed;

Figure 6 shows, offset to the left of its normal position on the partition, a plan view of the deflector plate;

Figure 7 shows in a plan view the reversed position of the deflector plate;

Figure 8 is an end view of the deflector plate; and,

Figure 9 is a perspective view of the partition member and its supporting means on the hopper bottom, looking in a direction parallel to the base portion of the partition.

Figure 1:
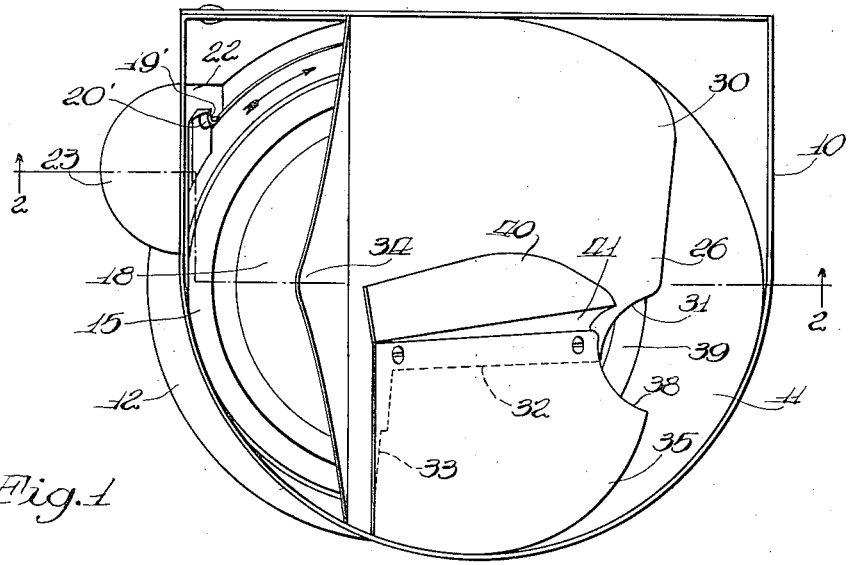
Figure 1 is a top plan view of a seed hopper with a partition and deflector mounted therein constituting the invention.

In the drawings a hopper 10 has been illustrated which, as evident from Figure 1, may be one half of a duplex hopper, the flat side portions of the hopper walls abutting each other. However, only one hopper is shown, as the invention does not relate to the duplex construction. The hopper 10 has an angularly sloping base portion 11 which joins with an inclined bottom portion 12 arranged at an angle of substantially 45 degrees. The bottom portion of the hopper includes an inwardly projecting cyindrical extension 13 on which a seed plate driving gear 14 is rotatably mounted. Said gear may be driven by any conventional driving mechanism. An annular seed plate 15 is concentrically mounted on the driving gear 14. Projecting lugs 16 on the gear engage openings 17 formed in the seed plate. A circular plate 18 is secured to the extension 13 overlapping the gear 14 and the central portion of the seed plate 15.

Figure 3:
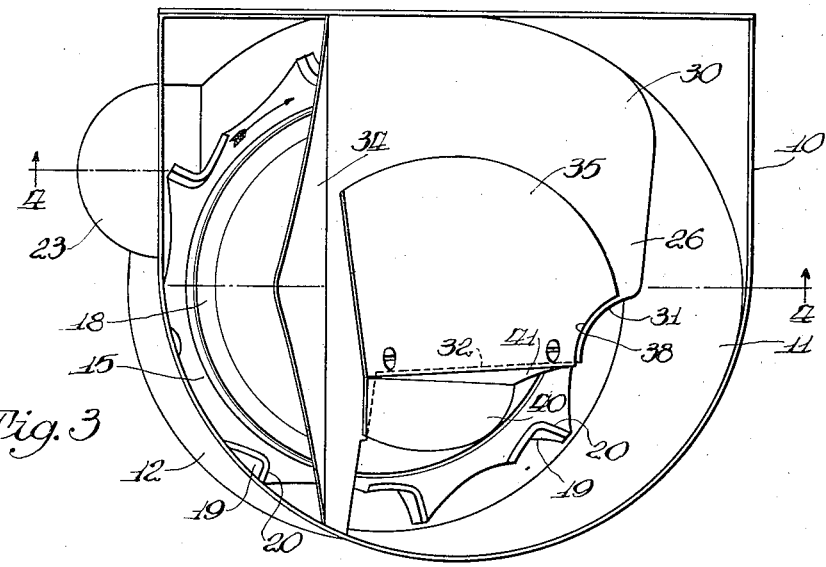
Figure 3 shows that same structure as Figure 1 with the deflector plate reversed in position for planting whole peanuts.
Figure 4:
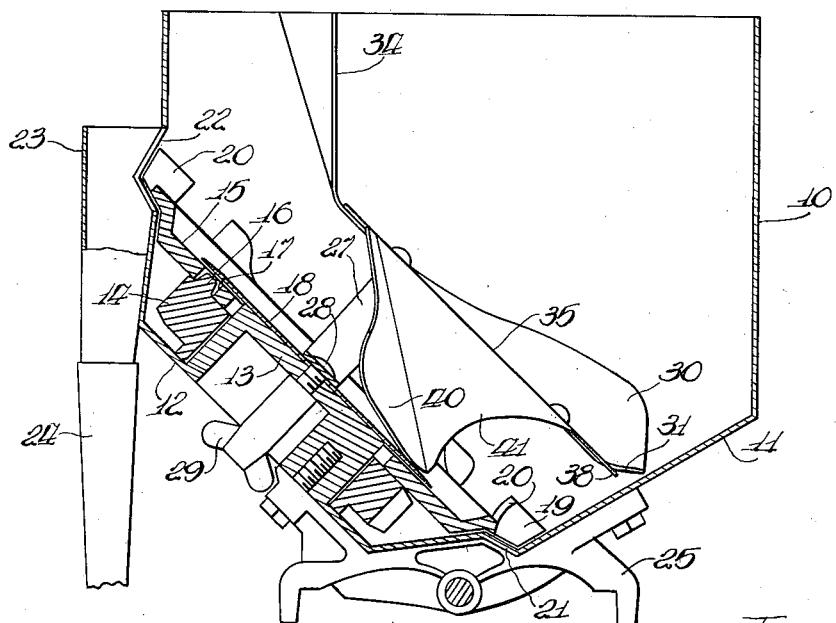
Figure 4 is a section taken substantially on the line 4—4 of Figure 3, showing the hopper partition and the deflector plate in perspective.

Around its periphery the seed plate 15 is provided with a plurality of seed cells 19, for whole peanuts as shown in Figures 3 and 4, formed by notches in the seed plate and by upstanding flanges 20 surrounding the notches. The notches are open on the forward side in the direction of rotation, as indicated by the arrows in Figure 3, so as to scoop up the seeds and carry them up the inclined surface of the annular ring 21, which is formed on the hopper bottom beneath the periphery of the seed plate.

Figure 2:
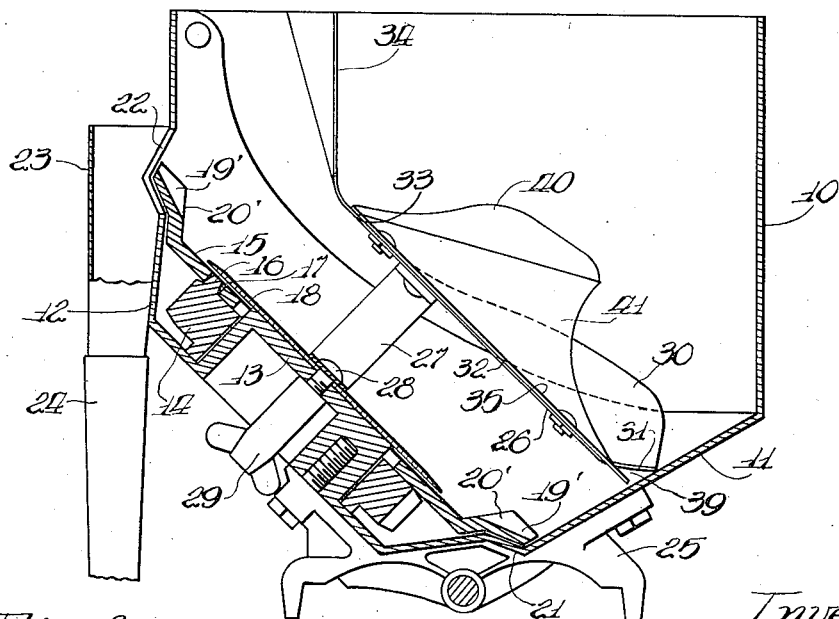
Figure 2 is a section taken substantially on the line 2—2 of Figure 1, showing the partition and deflector plate in perspective.

Seed cells 19' for shelled nuts are shown in the seed cells 19 of Figures 1 and 2. These cells are formed by notches in the seed plate and by upstanding flanges 20'.

At the high point of the inclined hopper bottom a seed discharge opening 22 is formed in the hopper wall and in the edge of the bottom abutting the wall at that point. A seed receiving conduit 23 is secured to the hopper to receive the seed discharged through the opening 22. The top of the conduit 23 is open, so that it may be cleaned and inspected from the top. From the conduit 23 the seed is discharged into a conduit 24 leading to the planter boot.

As shown in Figures 2 and 4, the hopper is supported in its proper position on a base member 25. Said member is shaped to be securely seated on a planter frame structure for mounting the hopper in operative position.

The seed hopper as above described is of a conventional construction. It has been found that by the use of an inclined bottom, in certain types of seeds it is possible to obtain a more uniform filling of seed compartments and to prevent the collection of seeds of different sizes or weights in the bottom of the hopper. Likewise, it is easy to discharge seed at a high level where there is little pressure due to the weight of seeds above the seed plate. This invention resides in the particular partition construction for the hopper, which will now be described.

A partition member 26 having a substantially flat base portion is secured by a supporting member 27 in spaced relation above the bottom of the hopper in a position substantially parallel to the plate 18 at the bottom of the hopper. The member 27 is rigidly secured by a bolt 28 and a wing nut 29 to the extension 13 of the hopper bottom, whereby the partition may be readily removed for inspecting and cleaning the hopper. The bottom portion of the partition substantially fits the contour of the hopper at one side, being turned up at 30 to assist the seed in sliding to the other side of the partition when the hopper is substantially empty. Along the other side of the hopper the partition 26 is cut away at its lower end, a curved opening 31 being formed in the partition, the curved edge forming said opening adjoining a straight edge 32 spaced a substantial distance from the hopper wall at that side and said edge 32 joining a stepped edge 33 extending substantially at right angles to the edge 33 over to the wall of the hopper.

At the upper side of the partition 26, a substantially vertical wall 34 is formed as an extension of the partition. Said wall extends up to the top of the hopper, having a V-shaped contour to add strength and to increase the capacity of the hopper and the availability of entrance into the hopper. The wall 34 is spaced from the hopper wall at its side of the hopper a sufficient distance to form a space for inspection of the seed plate and to reach into the hopper at that point for cleaning any accumulation of foreign material on the seed plate.

The partition 26 forms in effect a compartment between it and the seed plate, which will be designated as the seed plate compartment. Above the partition, a second compartment is formed, which will be designated as the seed supply compartment.

A deflector plate 35 is formed to be secured in two positions to the partition 26. As shown in Figure 6, spaced openings 36 formed in said plate are positioned in alignment with the spaced openings 37 as shown in Figure 5 formed along the edge 32 of the partition. When secured by bolts in the position shown in Figure 1, the deflector plate extends parallel to the flat portion of the partition 26 up to and closely adjacent the wall of the hopper. A notch is formed in the partition plate by a curved edge 38. Said curved edge in the position shown in Figure 1 overlaps the curved edge 31 of the partition, the notches formed by said edges forming a seed discharge opening 39. Said opening is of the proper size for the delivery of shelled peanuts to the seed plate compartment. The pressure of a hopper full of shelled peanuts necessitates a comparatively small opening to prevent undue pressure on the seed plate with subsequent injury to the seed. By providing a relatively small opening 39, a supply of peanuts is available above the seed plate to fill the cells as the seed plate rotates. At the end of the deflector plate 35 opposite the edge 38, said plate overlaps the stepped edge 33 of the partition.

A flange 40 is formed as an integral part of the deflector plate 35 and is integrally connected to said plate by a web 41 increasing in width from the straight end of the deflector plate to the curved notch thereof. When the plate is in the position shown in Figure 1, the flange 40 is merely upstanding in the hopper bottom and does not function in the operation of the planter.

When it is desired to plant peanuts in the shell, the deflector 35 is removed from the partition and reversed to the position shown in Figures 3 and 4 with the flat base portion overlapping the base portion of the partition 26 and with the flange 40 positioned down into the seed compartment terminating adjacent the seed cells. The connecting web 41, as clearly shown in Figure 4, is cut away at the end to provide for rotation therethrough of the seed cells 19. Said flange, as clearly shown in Figure 3, does not extend radially outwardly to the seed cells, leaving a free passage for the removal of seed which are engaged by the seed cells. In this position of adjustment, the deflector plate forms a guide-way for directing the whole peanuts into a position in which they are readily engaged by the seed cells. This design is of particular importance, as the bulk and light weight of whole peanuts necessitates a special construction to assure complete filling of the seed cells in a planter plate and to prevent cracking of the shells.

The operation of the planter as above described has been explained in connection with the description. It is to be understood that different seed plates are utilized for shelled and unshelled peanuts, the construction of the hopper permitting easy removal of the partition and the seed plate for exchanging the seed plate and for reversing the deflector plate of the partition.

Although applicants have shown and described a particular shape of reversible deflector plate which has been found effective, it is to be understood that they claim as their invention all modifications falling within the scope of the appended claims.

What is claimed is:

1. A seeding device comprising a hopper having an inclined bottom portion, a seed plate having seed cells formed therein rotatably mounted above said bottom portion, a seed discharge opening formed in the bottom portion at the upper edge thereof, a partition mounted in the hopper spaced above the seed plate forming a compartment above the seed plate and a seed supply compartment above the partition, said partition being provided with a side opening uncovering a plurality of the seed cells and forming a communication between the seed supply compartment and the seed plate compartment, and a deflector member removably secured to said partition adjacent the opening and reversible to form in one position a small opening for relatively small seeds and in another position a large opening and a directing wall extending towards the seed plate for large seeds.

2. A seeding device comprising a hopper having an inclined bottom portion, a seed plate having seed cells formed therein rotatably mounted above said bottom portion, a seed discharge opening formed in the bottom portion at the upper edge thereof, a partition mounted in the hopper spaced above the seed plate forming a compartment above the seed plate and a seed supply compartment above the partition, said partition being provided with a side opening uncovering a plurality of the seed cells and forming a communication between the seed supply compartment and the seed plate compartment, and a deflector member removably secured to said partition adjacent the opening, said deflector having a flat portion positioned to lie in a plane substantially parallel to the partition and a directing wall portion at an angle to the flat portion, said deflector being reversible to form with the partition a restricted opening for small seed in one position and a large opening in the reversed position, the directing wall portion extending adjacent the seed cells in said reversed position.

3. A seeding device comprising a hopper, a seed plate having seed cells formed therein rotatably mounted at the bottom of said hopper, a partition mounted in the hopper spaced above the seed plate forming a compartment above the seed plate and a seed supply compartment above the partition, said partition being provided with a side opening through which the seed supply compartment communicates with the seed plate compartment, and a deflector member removably secured to said partition adjacent the opening and reversible to form in one position a small opening for relatively small seeds and in another position a large opening and a directing wall extending towards the seed plate for large seeds.

GEORGE M. KRIEGBAUM.
CLARENCE C. HAAS.